(12) United States Patent
Correia

(10) Patent No.: US 6,290,459 B1
(45) Date of Patent: Sep. 18, 2001

(54) STATIONARY FLOWPATH COMPONENTS FOR GAS TURBINE ENGINES

(75) Inventor: Victor H. S. Correia, Milton Mills, NH (US)

(73) Assignee: General Electric Company, Cincinnati, OH (US)

( * ) Notice: Subject to any disclaimer, the term of this patent is extended or adjusted under 35 U.S.C. 154(b) by 0 days.

(21) Appl. No.: 09/431,462

(22) Filed: Nov. 1, 1999

(51) Int. Cl.[7] ..................................................... F01D 25/26
(52) U.S. Cl. ......................... 415/139; 415/191; 415/208.2
(58) Field of Search ..................................... 415/135, 139, 415/138, 191, 208.2, 209.2, 209.3, 209.4, 210.1; 277/643, 634, 637

(56) References Cited

U.S. PATENT DOCUMENTS

| | | | |
|---|---|---|---|
| 3,302,926 | * | 2/1967 | Bobo ..................................... 415/139 |
| 3,728,041 | * | 4/1973 | Bertelson .............................. 415/139 |
| 3,970,318 | * | 7/1976 | Tuley .................................... 415/139 |
| 4,623,298 | * | 11/1986 | Hallinger et al. ..................... 415/139 |
| 4,804,311 | * | 2/1989 | Anderson et al. ..................... 415/191 |
| 5,634,766 | * | 6/1997 | Cunha et al. .......................... 415/191 |
| 6,030,178 | * | 2/2000 | Caruso .............................. 416/193 A |
| 6,109,869 | * | 8/2000 | Maddaus et al. .................. 415/208.2 |

OTHER PUBLICATIONS

Patent application Ser. No. 09/294,551 (Attorney Docket No. 13DV–12915), filed Apr. 20, 1999.

* cited by examiner

Primary Examiner—F. Daniel Lopez
Assistant Examiner—James M. McAleenan
(74) Attorney, Agent, or Firm—Andrew C. Hess; Rodney M. Young

(57) ABSTRACT

Cooling is facilitated in stationary flowpath components, such as turbine nozzle segments and shrouds, by providing circumferential edges defining a non-linear curvature that matches the curvature of the flow line defined by the gas flow past the stationary flowpath component. A flexible seal member is provided to accommodate the non-linear edges.

19 Claims, 4 Drawing Sheets

STATIONARY FLOWPATH COMPONENTS FOR GAS TURBINE ENGINES

BACKGROUND OF THE INVENTION

This invention relates generally to gas turbine engines and more particularly to stationary flowpath components, such as nozzle segments and turbine shrouds, used in such engines.

A gas turbine engine includes a compressor that provides pressurized air to a combustor wherein the air is mixed with fuel and ignited for generating hot combustion gases. These gases flow downstream to one or more turbines that extract energy therefrom to power the compressor and provide useful work such as powering an aircraft in flight. Each turbine stage commonly includes a turbine rotor and a stationary turbine nozzle for channeling combustion gases into the turbine rotor disposed downstream thereof. The turbine rotor includes a plurality of circumferentially spaced apart blades extending radially outwardly from a rotor disk that rotates about the centerline axis of the engine. The nozzle includes a plurality of circumferentially spaced apart vanes radially aligned with the rotor blades. Turbine nozzles are typically segmented around the circumference thereof with each nozzle segment having one or more nozzle vanes disposed between inner and outer bands that define the radial flowpath boundaries for the hot combustion gases flowing through the nozzle.

Each turbine stage further includes a shroud assembly located immediately downstream of the turbine nozzle. The shroud assembly closely surrounds the turbine rotor and thus defines the outer radial flowpath boundary for the hot combustion gases flowing therethrough. A typical shroud assembly comprises a shroud support which is fastened to the engine outer case and which in turn supports a plurality of shrouds. The shrouds are arcuate, rectangular components arranged circumferentially in an annular array so as to encircle the rotor blades.

A small gap exists between the adjoining circumferential edges of adjacent shrouds. To reduce leakage between adjacent shrouds, the gaps are sealed with spline seals, which comprise thin sheet metal strips inserted into slots cut in the circumferential edges of the shrouds so as to span the gap. Similarly, both the outer and inner bands of each nozzle segment define circumferential edges that adjoin the circumferential edges of adjacent nozzle segments. These junctions are likewise sealed with spline seals.

To better accommodate the spline seals, the circumferential edges of the shrouds and nozzle segments have been limited to linear edges. Typically, nozzle circumferential edges form either a single straight cut at an angle relative to the axial direction of the engine, or a series of straight cuts arranged in a "dog leg" or "z-shaped" configuration to reduce overhang with respect to the airfoil. Shrouds are generally rectangular with their circumferential edges running in the axial direction.

Because nozzle segments and shrouds operate in a high temperature environment, it is necessary that they be cooled to avoid reduced service life or even material failure. This cooling is ordinarily accomplished internally by using cooling air extracted from the compressor. However, the linear circumferential edges of these stationary flowpath components result in sharp corners that are difficult to cool. This is particularly so with the single cut angled edges of many nozzle segments, which define an extremely sharp corner. Moreover, the linear circumferential edges of the nozzle segments and the shrouds do not follow the naturally curved flow lines of the nozzle and the turbine rotor, respectively. Thus, the gases cross each gap between adjoining circumferential edges (in both the nozzle and the rotor) at least once. When this occurs, the boundary layer of the gases is "tripped," thereby causing turbulence and higher convection coefficients, which results in local areas of higher temperature along the circumferential edges. As a result of boundary layer tripping, the circumferential edges of nozzle segments and shrouds are often the most difficult areas to cool.

Accordingly, there is a need for stationary flowpath components that avoid boundary layer tripping.

SUMMARY OF THE INVENTION

The above-mentioned need is met by the present invention which provides a stationary flowpath component, such as a turbine nozzle segment or shroud, having at least one circumferential edge defining a non-linear curvature. Preferably, the non-linear curvature matches the curvature of the flow line defined by the gas flow past the stationary flowpath component. A flexible seal member is provided to accommodate the non-linear edges.

The present invention and its advantages over the prior art will become apparent upon reading the following detailed description and the appended claims with reference to the accompanying drawings.

DESCRIPTION OF THE DRAWINGS

The subject matter which is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
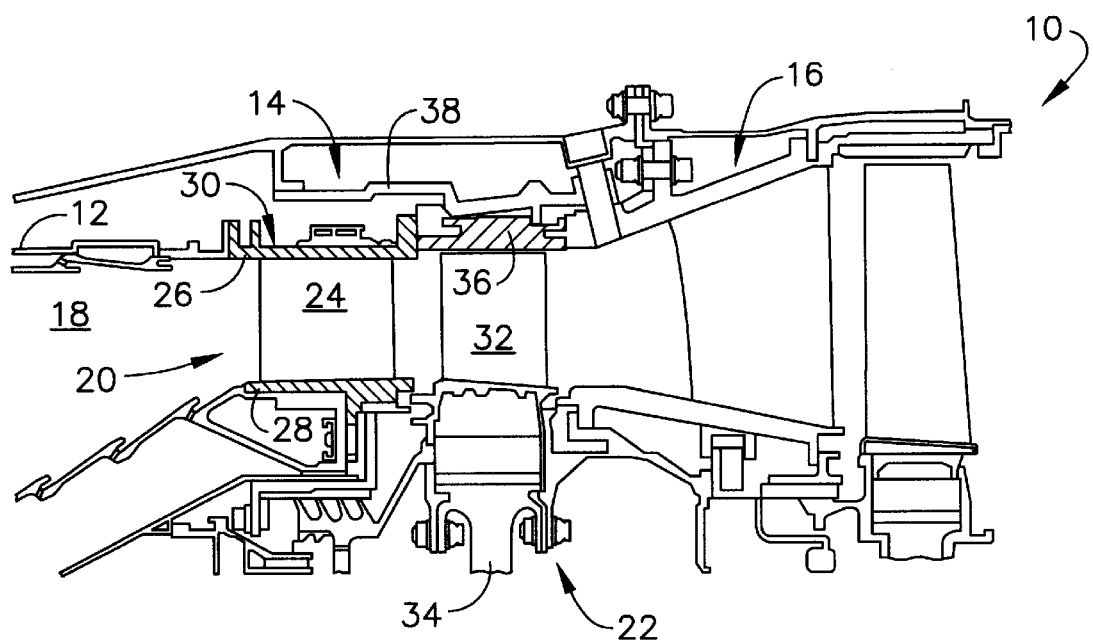
FIG. 1 is a partial cross-sectional view of a gas turbine engine having the stationary flowpath components of the present invention.

Referring to the drawings wherein identical reference numerals denote the same elements throughout the various views, FIG. 1 shows a portion of a gas turbine engine 10 having, among other structures, a combustor 12, a high pressure turbine 14, and a low pressure turbine 16. The combustor 12 includes a generally annular hollow body defining a combustion chamber 18 therein. A compressor (not shown) provides compressed air that passes primarily into the combustor 12 to support combustion and partially around the combustor 12 where it is used to cool both the combustor liners and turbomachinery further downstream.

Fuel is introduced into the forward end of the combustor 12 and is mixed with the air in a conventional fashion. The resulting fuel-air mixture flows into the combustion chamber 18 where it is ignited for generating hot combustion gases. The hot combustion gases are discharged to the high pressure turbine 14 located downstream of the combustor 12 where they are expanded so that energy is extracted. The hot gases then flow to the low pressure turbine 16 where they are expanded further.

Figure 2:
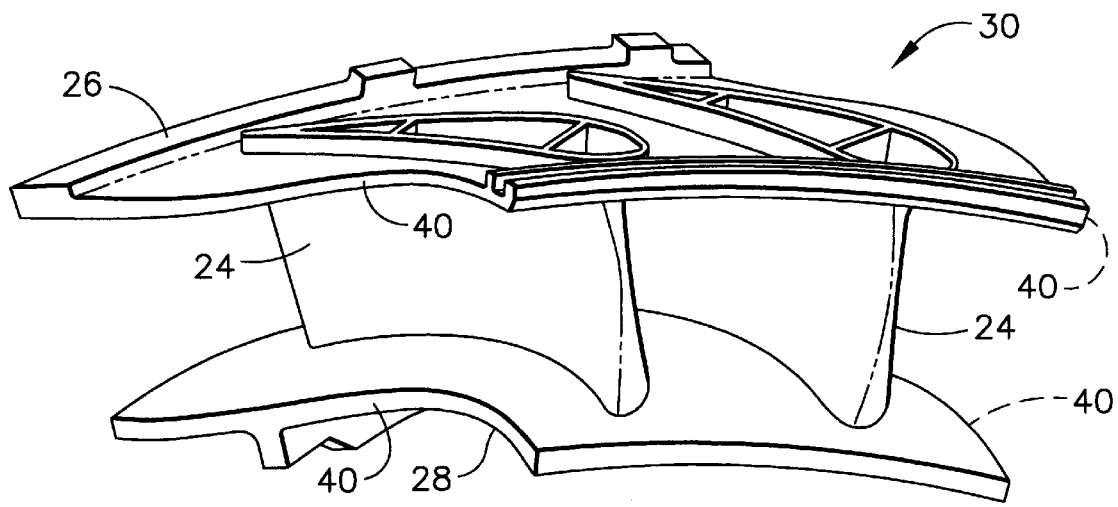
FIG. 2 is a perspective view of a nozzle segment from the gas turbine engine of FIG. 1.

The high pressure turbine 14 includes a turbine nozzle 20 and a turbine rotor 22. The turbine nozzle 20 includes a plurality of circumferentially spaced vanes 24 (only one shown in FIG. 1) that are supported between a number of arcuate outer bands 26 and arcuate inner bands 28. The vanes 24, outer bands 26 and inner bands 28 are arranged into a plurality of circumferentially adjoining nozzle segments 30 that collectively form a complete 360° assembly. As seen best in FIG. 2, each nozzle segment 30 has two of the vanes 24 disposed between one of the outer bands 26 and one of the inner bands 28. It should be noted that the present invention is not limited to nozzle segments having two vanes, as nozzle segments having other numbers of vanes are known. In any event, the vanes 24 have airfoils that are configured so as to optimally direct the combustion gases to the turbine rotor 22. The outer and inner bands 26 and 28 of each nozzle segment 30 define the outer and inner radial boundaries, respectively, of the gas flow through the nozzle 20. Thus, the nozzle segments 30 are referred to herein as stationary flowpath components.

The turbine rotor 22 includes a plurality of circumferentially spaced apart blades 32 (only one shown in FIG. 1) extending radially outwardly from a rotor disk 34 that rotates about the centerline axis of the engine. The blades 32 include airfoil portions that extend into the gas flow. A plurality of arcuate shrouds 36 is arranged circumferentially in an annular array so as to closely surround the rotor blades 32 and thereby define the outer radial flowpath boundary for the hot combustion gases flowing through the turbine rotor 22. The shrouds 36 are stationary members supported by a shroud support 38 that is fastened to the engine outer case in a conventional manner. Thus, the shrouds 36 are also referred to as stationary flowpath components.

Figure 3:
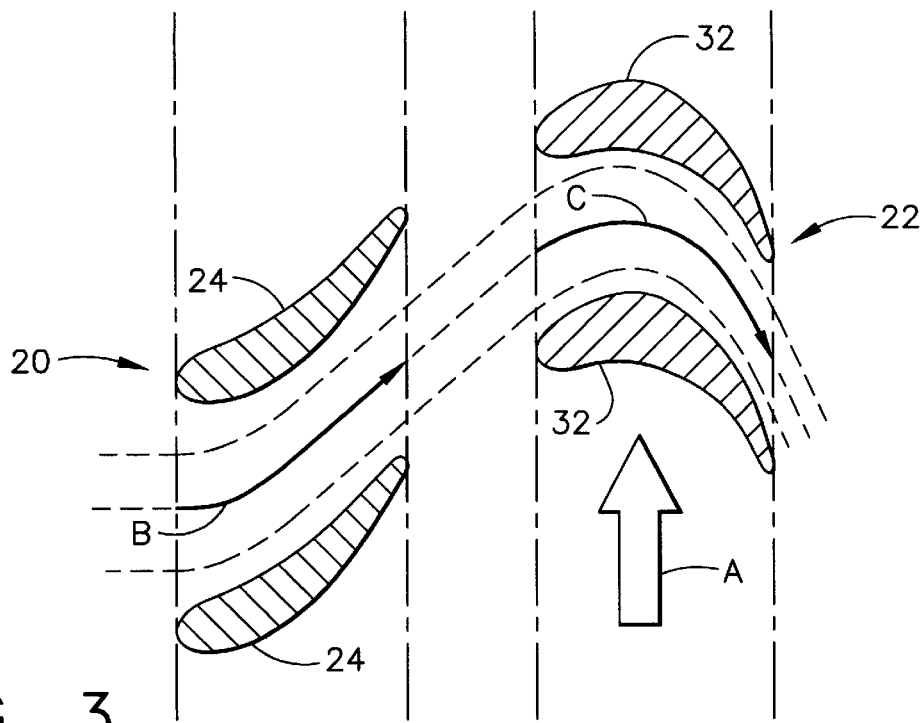
FIG. 3 is a radial view of a portion of the turbine section from the gas turbine engine of FIG. 1.

Referring to FIG. 3, a radial view of a portion of the high pressure turbine 14 is shown. Two adjacent nozzle vanes 24, and two adjacent rotor blades 32, immediately downstream of the vanes 24, are shown to illustrate the flow of the hot combustion gases therethrough. The direction of rotation of the turbine rotor 22 is represented by the arrow A. The hot combustion gases discharged from the combustor 12 initially flow in a substantially axial direction. As the gas flow passes through the turbine nozzle 20, the vanes 24 direct the hot gases along a flow path that is at an angle relative to the axial direction of the engine 10. Thus, the gas flow through the vanes 24 defines a curved flow line B that is shaped by the contour of the vane airfoils. The gas flow is then redirected by the rotor blades 32 as it passes through the turbine rotor 22 such that it defines a curved flow line C that is shaped by the contour of the blade airfoils.

Figure 4:
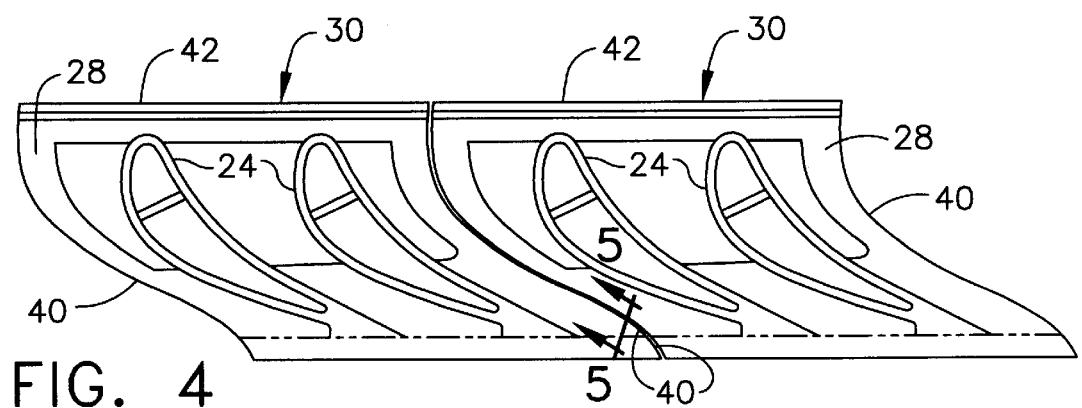
FIG. 4 is a radial view of two adjacent nozzle segments.

Referring again to FIG. 2, both the outer band 26 and the inner band 28 of each nozzle segment 30 have two circumferential edges 40. The respective outer band circumferential edges 40 of adjacent nozzle segments 30 closely adjoin one another, and the respective inner band circumferential edges 40 of adjacent nozzle segments 30 also closely adjoin one another. As seen best in FIG. 4, which shows two adjacent nozzle segments 30, the circumferential edges 40 are shaped so as to define a non-linear curvature that matches the curvature of the nozzle flow line B. Specifically, the circumferential edges 40 of both the outer band 26 and the inner band 28 extend axially from the forward edge 42 of the nozzle segment 30 until the axial plane defined by the leading edges of the vanes 24. At this point, the circumferential edges 40 curve to match the flow line B. Although only the inner bands 28 are shown in FIG. 4, the circumferential edges 40 of the outer bands 26 have the same configuration as those of the inner bands 28.

Because the circumferential edges 40 define a curvature that matches that of the flow line B, the gas flow does not tend to cross the gap formed by adjoining circumferential edges. Accordingly, boundary layer tripping, and the associated higher convection coefficients, is greatly reduced. The reduced thermal burden allows the nozzle segments 30 to be cooled more effectively along the circumferential edges 40. The curved circumferential edges 40 eliminate the sharp corners found in flowpath components having linear circumferential edges, thus further facilitating cooling of the nozzle segments 30. In addition, the actual length of the non-linear circumferential edges 40 from the forward to aft edges will generally be shorter than conventional angled single or multiple linear cut edges. This shorter length will reduce the leakage area between adjacent nozzle segments, thereby improving turbine efficiency.

It should be noted that the curvature of the flow line B will vary somewhat for different engine operating conditions. For instance, in gas turbine engines used to power aircraft, the flow lines will vary slightly between takeoff and cruise conditions. The curvature of the circumferential edges 40 is thus optimized such that it matches the flow line B that occurs for the operating condition that produces the highest heat load.

Figure 5:
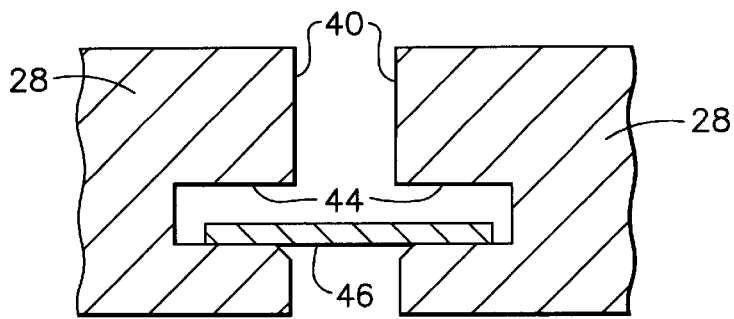
FIG. 5 is a cross-sectional view taken along line 5—5 of FIG. 4.

As with conventional nozzle segments, a small gap exists between adjoining circumferential edges 40 of adjacent nozzle segments 30. However, with the non-linear circumferential edges 40, traditional spline seals would tend to crimp and buckle under the relative radial motion between adjacent nozzle segments 30 that occurs due to mechanical and thermal loading. As shown in FIG. 5, the sealing configuration of the present invention includes slots 44 cut into the circumferential edges 40 of the inner bands 28 of each nozzle segment 30. (Since the sealing configuration is the same for both the outer and inner bands 26 and 28, only one is shown in the drawings.) The slots 44 of the inner bands 28 of adjacent nozzle segments 30 are aligned radially and are coextensive with each other with respect to the circumferential direction.

Figure 6:
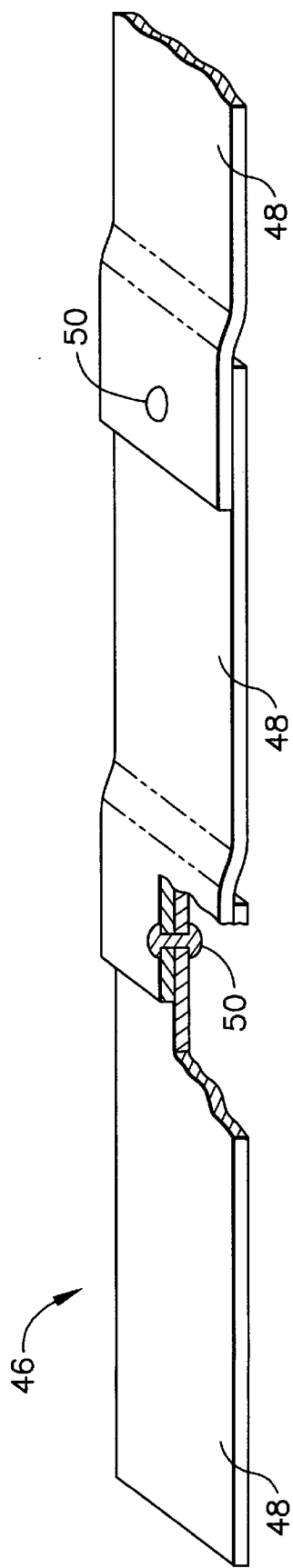
FIG. 6 is a perspective view of a first embodiment of a flexible seal member of the present invention.

A flexible seal member 46 is inserted into the slots 44 of adjacent nozzle segments so as to span the gap therebetween. Turning to FIG. 6, the flexible seal member 46 includes a plurality of thin sheet segments 48, arranged lengthwise and overlapping at adjoining ends. The overlapping ends are joined together by a suitable fastener, such as a pin or rivet 50, that permits rotation of one segment 48 relative to the other. This will prevent transverse buckling that would occur with a single sheet spline seal cut to fit the curved slots 44 due to relative radial motion of the nozzle segments 30. The seal segments 48 and the rivets 50 are preferably made of a suitable metal material such as cobalt-based alloys. The length and number of seal segments 48 used in a seal member 46 can be tailored to suit the geometry and radial motion of the particular gap that is being sealed. However, the more segments 48 that are used, the higher the leakage through the flexible seal member 46 will be. Thus, the number of segments 48 should be minimized while still maintaining adequate flexibility to prevent buckling.

Figure 7:
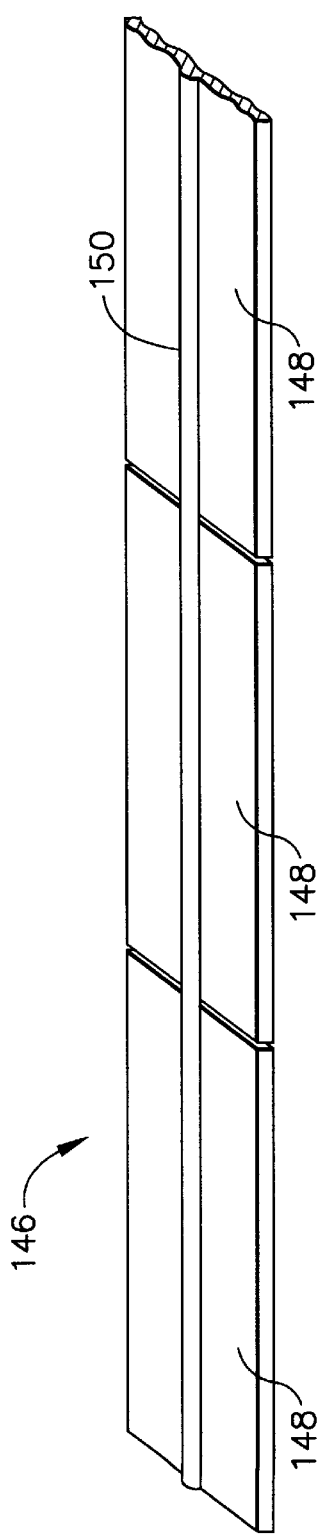
FIG. 7 is a perspective view of a second embodiment of a flexible seal member of the present invention.

An alternative flexible seal member 146 is shown in FIG. 7. The flexible seal member 146 includes a plurality of thin sheet segments 148, arranged lengthwise. The segments 148 are joined to a flexible wire 150 that runs along the length of the segments 148. The wire 150 acts as a "spine" that permits relative motion, including rotational motion, between the segments 148 and provides flexible support and structure to the seal member 146.

Figure 8:
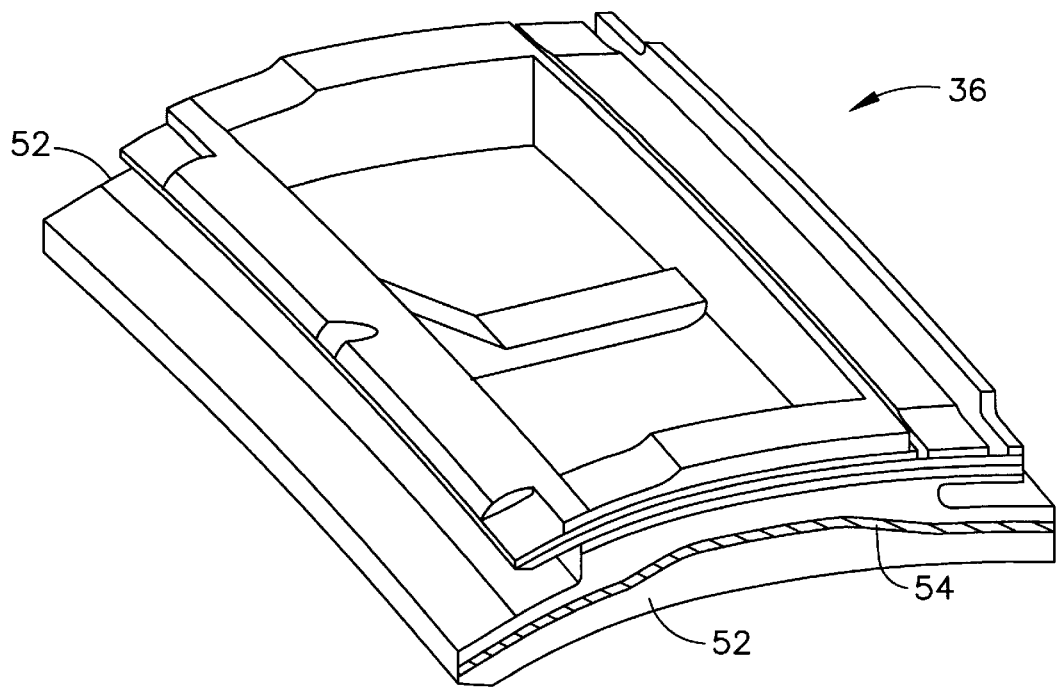
FIG. 8 is a perspective view of a turbine shroud from the gas turbine engine of FIG. 1.
Figure 9:
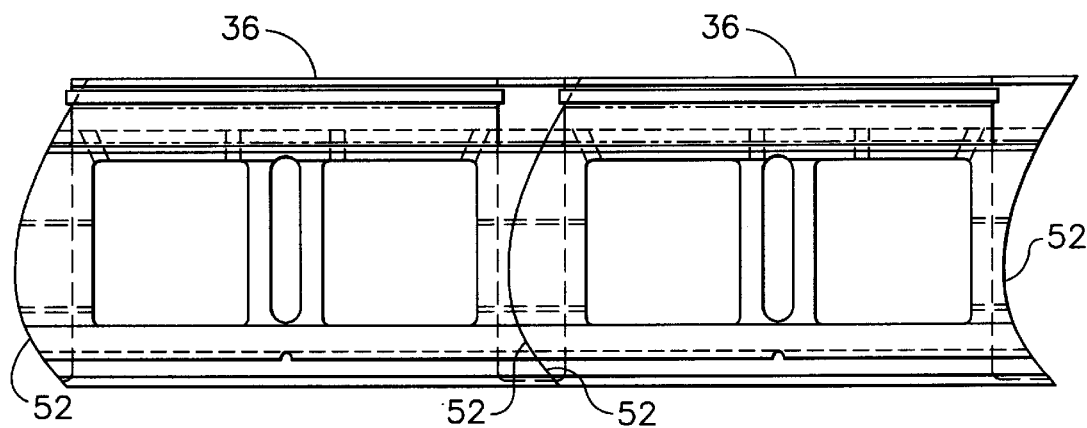
FIG. 9 is a radial view of two adjacent shrouds.

Referring to FIGS. 8 and 9, it is seen that each shroud 36 has two circumferential edges 52. The respective circumferential edges 52 of adjacent shrouds 36 closely adjoin one another. As seen best in FIG. 9, which shows two adjacent shrouds 36, the circumferential edges 52 are shaped so as to define a non-linear curvature that matches the curvature of the turbine rotor flow line C. Thus, as with the nozzle segments 30, the flow line matching curvature of the circumferential edges 52 greatly reduces boundary layer tripping and the associated higher convection coefficients. Accordingly, the shrouds 36 can be cooled more effectively along the circumferential edges 52. The curvature of the circumferential edges 52 is optimized such that they match the flow line C that occurs for the operating condition of engine 10 that produces the highest heat load.

Adjoining circumferential edges 52 of adjacent shrouds 36 will also have a small gap that needs to be sealed. As with the nozzle segments 30, the sealing configuration includes slots 54 cut into the circumferential edges 52 of each shroud 36, and the slots 54 of adjacent shrouds 36 are aligned radially and are coextensive with each other with respect to the circumferential direction. A seal member is inserted into the slots 54 of adjacent shrouds 36 so as to span the gap therebetween. This seal member can be one of the flexible seal members of the present invention that are described above, or, because shrouds typically do not experience as much relative radial motion as nozzle segments, the shroud seal member can be a single sheet spline seal.

The foregoing has described stationary flowpath components having non-linear circumferential edges that minimize boundary layer tripping. While specific embodiments of the present invention have been described, it will be apparent to those skilled in the art that various modifications thereto can be made without departing from the spirit and scope of the invention as defined in the appended claims.

What is claimed is:

1. In a gas turbine engine having a plurality of circumferentially spaced airfoils through which a gas flow passes, said gas flow defining a flow line, a stationary flowpath component having at least one circumferential edge defining a non-linear curvature wherein said non-linear curvature matches the curvature of said flow line.

2. The stationary flowpath component of claim 1 wherein said component includes a second circumferential edge that defines a curvature that matches the curvature of said flow line.

3. The stationary flowpath component of claim 1 wherein said component is a nozzle segment comprising an outer band, an inner band, and at least one nozzle vane disposed between said outer and inner bands, said at least one circumferential edge being formed on one of said outer and inner bands.

4. The stationary flowpath component of claim 3 wherein said one of said outer and inner bands includes a second circumferential edge that defines a curvature that matches the curvature of said flow line.

5. The stationary flowpath component of claim 4 wherein the other one of said outer and inner bands includes two circumferential edges that define a curvature that matches the curvature of said flow line.

6. The stationary flowpath component of claim 1 wherein said component is a shroud.

7. The stationary flowpath component of claim 6 wherein said shroud includes a second circumferential edge that defines a curvature that matches the curvature of said flow line.

8. In a gas turbine engine having a plurality of circumferentially spaced airfoils through which a gas flow passes, said gas flow defining a flow line, a plurality circumferentially arranged nozzle segments, wherein each one of said nozzle segments includes at least one circumferential edge defining a curvature that matches the curvature of said flow line.

9. The plurality of nozzle segments of claim 8 wherein each one of said nozzle segments comprises an outer band, an inner band, and at least one nozzle vane disposed between said outer and inner bands, said at least one circumferential edge being formed on one of said outer and inner bands.

10. The plurality of nozzle segments of claim 9 wherein said one of said outer and inner bands includes a second circumferential edge that defines a curvature that matches the curvature of said flow line.

11. The plurality of nozzle segments of claim 10 wherein the other one of said outer and inner bands includes two circumferential edges that define a curvature that matches the curvature of said flow line.

12. The plurality of nozzle segments of claim 8 further comprising a flexible seal member disposed between adjacent ones of said nozzle segments.

13. The plurality of nozzle segments of claim 12 wherein each one of said flexible seal members comprises a plurality of segments, adjacent ones of said segments being joined by a fastener that permits rotation of one segment relative to the other.

14. The plurality of nozzle segments of claim 12 wherein each one of said flexible seal members comprises a plurality of segments joined to a flexible wire.

15. In a gas turbine engine having a plurality of circumferentially spaced airfoils through which a gas flow passes, said gas flow defining a flow line, a plurality circumferentially arranged shrouds, wherein each one of said shrouds includes at least one circumferential edge defining a curvature that matches the curvature of said flow line.

16. The plurality of shrouds of claim 15 wherein each one of said shrouds includes a second circumferential edge that defines a curvature that matches the curvature of said flow line.

17. The plurality of shrouds of claim 15 further comprising a flexible seal member disposed between adjacent ones of said shrouds.

18. The plurality of shrouds of claim 17 wherein each one of said flexible seal members comprises a plurality of segments, adjacent ones of said segments being joined by a fastener that permits rotation of one segment relative to the other.

19. The plurality of shrouds of claim 17 wherein each one of said flexible seal members comprises a plurality of segments joined to a flexible wire.

* * * * *